United States Patent [19]
Chan

[11] Patent Number: 5,214,550
[45] Date of Patent: May 25, 1993

[54] MINIATURE REMOVABLE RIGID DISK DRIVE AND CARTRIDGE SYSTEM

[75] Inventor: John R. Chan, Fremont, Calif.

[73] Assignee: Zentek Storage of America, Inc., San Jose, Calif.

[21] Appl. No.: 673,782

[22] Filed: Mar. 22, 1991

[51] Int. Cl.⁵ .............................................. G11B 5/012
[52] U.S. Cl. .............................. 360/97.01; 360/98.04; 360/133
[58] Field of Search ............... 360/97.01, 98.04–98.06, 360/133

[56] References Cited

U.S. PATENT DOCUMENTS 4,359,762 11/1982 Stollorz ........................ 360/133 X
4,965,691 10/1990 Iftikar ............................ 360/133

Primary Examiner—A. J. Heinz
Attorney, Agent, or Firm—Rosenblum, Parish & Isaacs

[57] ABSTRACT

A miniature removable rigid disk drive and cartridge including a removable, self-contained hard disk storage device. The disk drive includes mechanical and electrical components that act in conjunction with components in the disk cartridge when it is placed within the disk drive. The combination of drive and cartridge function as a complete and separate hard disk storage unit within the computer, but with the disk cartridge readily removable therefrom.

The disk drive and disk cartridge act in conjunction to form a complete miniature removable rigid disk drive and cartridge system. Because the disk and heads are mounted on the same base within the disk cartridge, interchangeability problems are eliminated. More specifically, there can be no misalignment of the head and disk because both are implemented within a common device. Additionally, because the disk cartridge is designed to occupy the least possible volume, it is easily transportable. Moreover, the small size of the disk cartridge makes it ideal for both the main storage and the backup files for a computer system. And, despite the small size and transportability of the cartridge, it retains the capacity and access speed of a normal rigid disk, as well as the added reliability and ruggedness inherent in rigid disk devices.

8 Claims, 13 Drawing Sheets

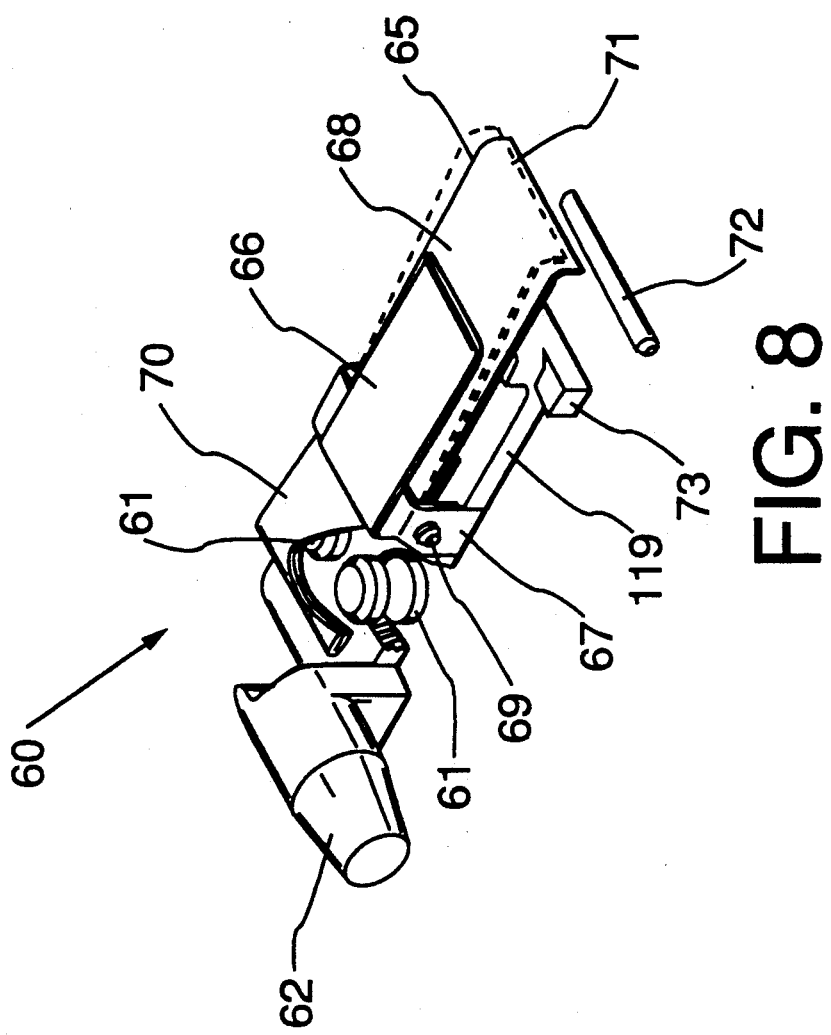

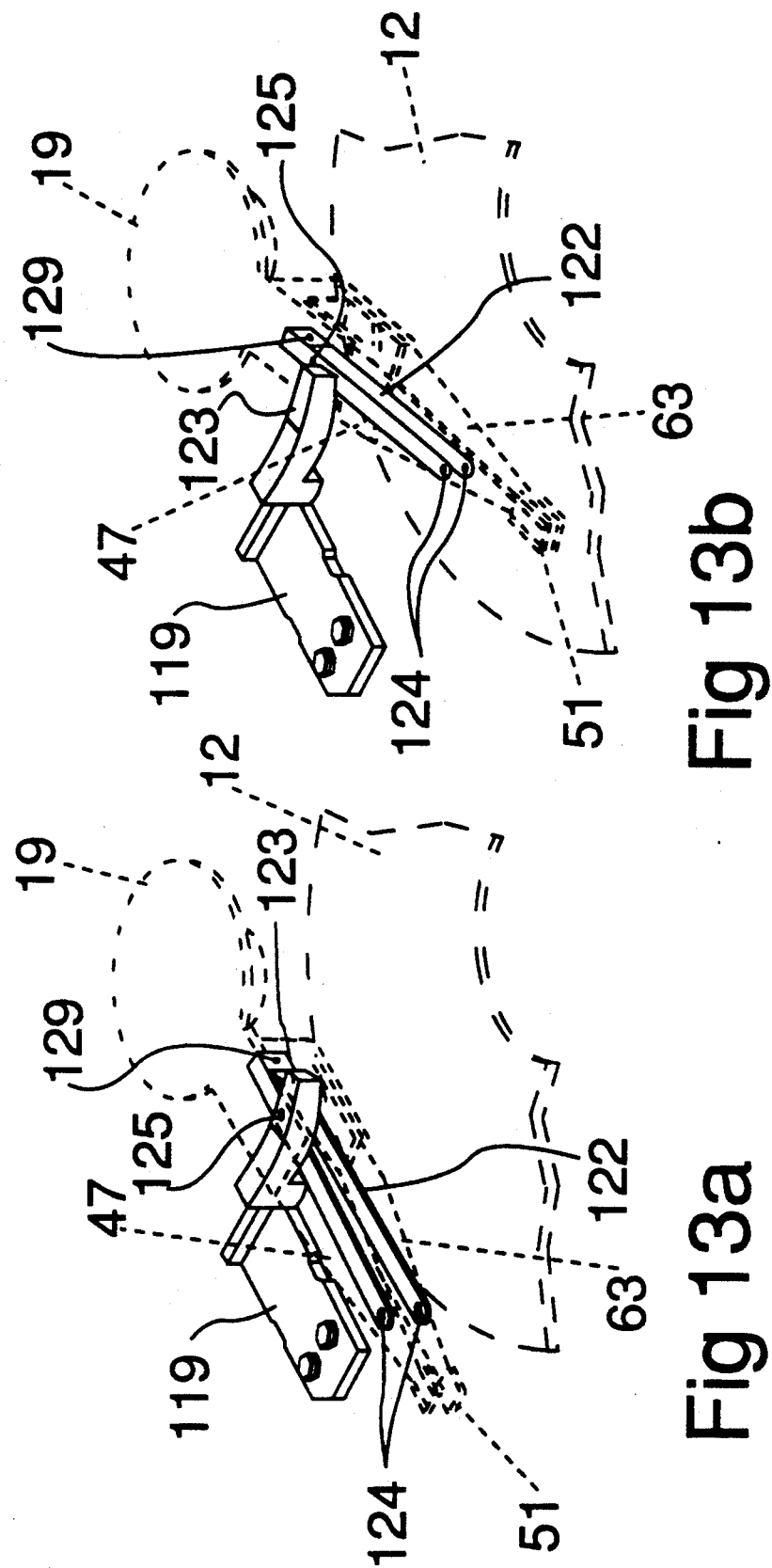

MINIATURE REMOVABLE RIGID DISK DRIVE AND CARTRIDGE SYSTEM

BACKGROUND OF THE INVENTION

1. Field of the Invention

The present invention relates generally to magnetic storage devices for storing and retrieving information utilizing a magnetic media and, more specifically, to an improved magnetic storage device including a miniature rigid disk cartridge and associated rigid disk drive which act in conjunction to provide a portable and interchangeable rigid magnetic media information storage and retrieval system.

2. Brief Description of Prior Art

The computer industry offers a large variety of computers and related products in hopes of satisfying the continuous demand for new and innovative high-tech electronic instruments. Much of the emphasis in computer design is on producing devices which are as physically compact as possible, but which retain all of the advantageous features that the latest technology avails. Much emphasis has also been placed upon providing these devices with enlarged information storage capacities, which still allow a fast access time, and provide protection for the recording media. Presently, most computers use some sort of combination of fixed hard disk drives and floppy disk drives or tape drives. The hard disk drive has a higher storage capacity than a floppy drive and allows a faster information access time. However, hard disks are usually internally fixed within the computer casing and are thus not available for removal or interchange with other systems. Floppy disks and tape drives allow removability and interchangeability with other systems, however, they are generally slower to access than the rigid disks and, in the case of floppies, offer a much diminished storage capacity. Neither the floppy disk nor tape drive cartridges provide much protection for the recording media, as both are composed of a housing usually made of plastics. Additionally, the floppy media and tape drive cartridge media are both subject to damaging media wear. There are removable hard disk cartridges available which are similar to floppies except that the hard disk cartridges have a higher storage capacity. However, such hard disk cartridges share a common flaw with the floppy disk and tape cartridge in that all are easily exposed to the external environment and hence contamination. This often results in head crash failure and consequent loss of stored information. A further problem common to all existing tape cartridges, floppy disks and rigid disk cartridges is that, although the disk or tape is removable, the recording head is still located in the drive. This often results in head and tape or disk misalignment and leads to a significant problem in interchangeability between media and drives. Although some manufacturers have recently attempted to remedy these problems by making the complete rigid disk drive system (with or without the circuit boards) removable from a computer system, such attempts have proved to be expensive and the resulting removable unit is bulky and far from conveniently portable.

SUMMARY OF THE PRESENT INVENTION

An object of the present invention is to provide a rigid disk information storage cartridge and associated drive system which is designed and constructed to provide the greater memory capacity and faster access time of a hard disk drive while retaining the removability and portability of a floppy disk drive.

A further object of the present invention is to provide a rigid disk information storage cartridge and a drive system which is designed and constructed to occupy a minimum of space and is easily removable for convenient transportation.

Another objective of the present invention is to provide a rigid disk information storage cartridge and a drive system which allows cartridge interchangeability between various drives located in separate computer systems, without misalignment problems or the like.

Yet another objective of the present invention is to provide an information storage cartridge having means for insuring proper alignment between the rigid disk media and the read/write heads.

A further objective of the present invention is to provide a rigid disk information storage cartridge and a drive system wherein increased protection is provided against contamination, electro-magnetic interference, adverse environmental conditions, shock and vibration.

In order to achieve the above objectives, a preferred embodiment comprises a miniature rigid disk drive system which is capable of being removed from its operational setting (usually a computer) and a miniature rigid disk cartridge which is designed for use with the drive system and contains both the media and heads. The cartridge provides a compact and portable hard disk storage unit.

Briefly, the disk cartridge is a removable hard disk storage unit which provides the capacity, low access time and security of a rigid disk, but retains the transportability and interchangeability of a floppy disk. The disk drive system includes mechanical and electrical components that act in conjunction with components in the disk cartridge when the latter is placed within the disk drive. The combination of drive and cartridge function as a complete and separate hard disk storage unit within the computer, but with the disk cartridge readily removable therefrom.

The disk drive and disk cartridge act in conjunction to form a complete miniature removable rigid disk drive and cartridge system. Because the disk heads are mounted on the same base within the disk cartridge, interchangeability problems are minimized. More specifically, the risk of misalignment of the head and disk is reduced because both are implemented within a common device. Additionally, because the disk cartridge is designed to occupy the least possible space, it is easily transportable. Thus, it provides excellent application possibilities for system security, as access to the information on the disk can be regulated by physical removal and storage of the disk. Moreover, the small size of the disk cartridge makes it ideal for both the main storage and the backup files for a computer system. And, despite the small size and transportability of the cartridge, it retains the capacity and fast access time of a normal rigid disk, as well as the added reliability and ruggedness inherent in rigid disk devices.

IN THE DRAWINGS

FIG. 8 is a broken perspective view of the integral head load/unload ramp and actuator lock mechanism.

Figure 9A:
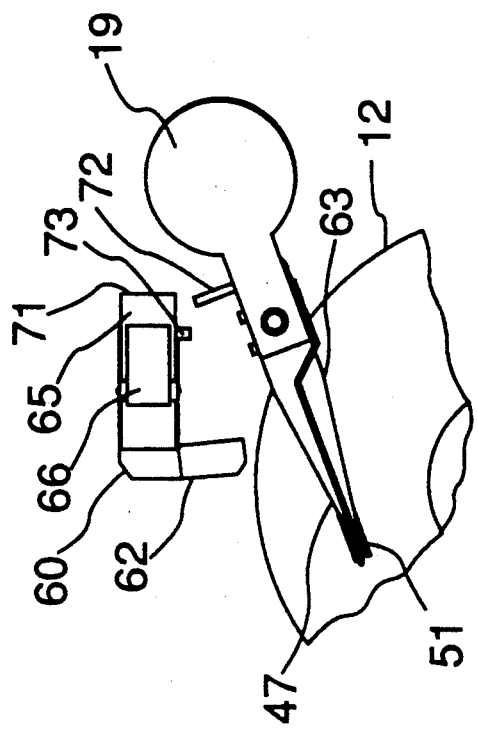

FIG. 9a a top view of a partial disk, reading means and actuator locking mechanism in a locked position.

Figure 9B:
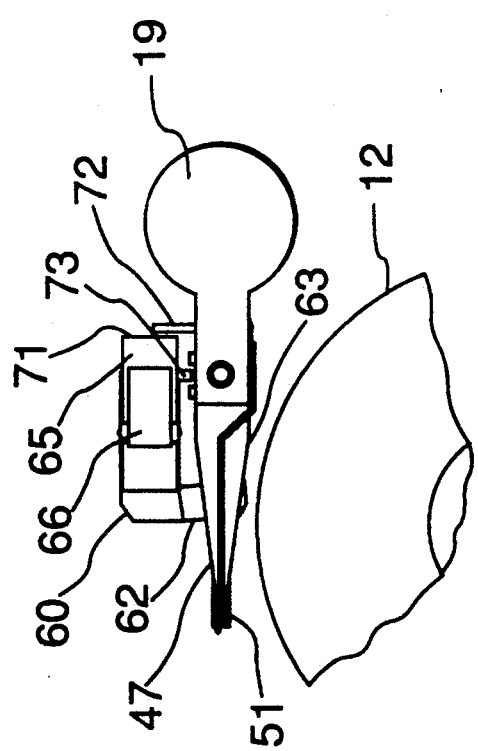

FIG. 9b is a top view of a partial disk, reading means, head loading and unloading ramp, and actuator locking mechanism in an unlocked position.

Figure 10:
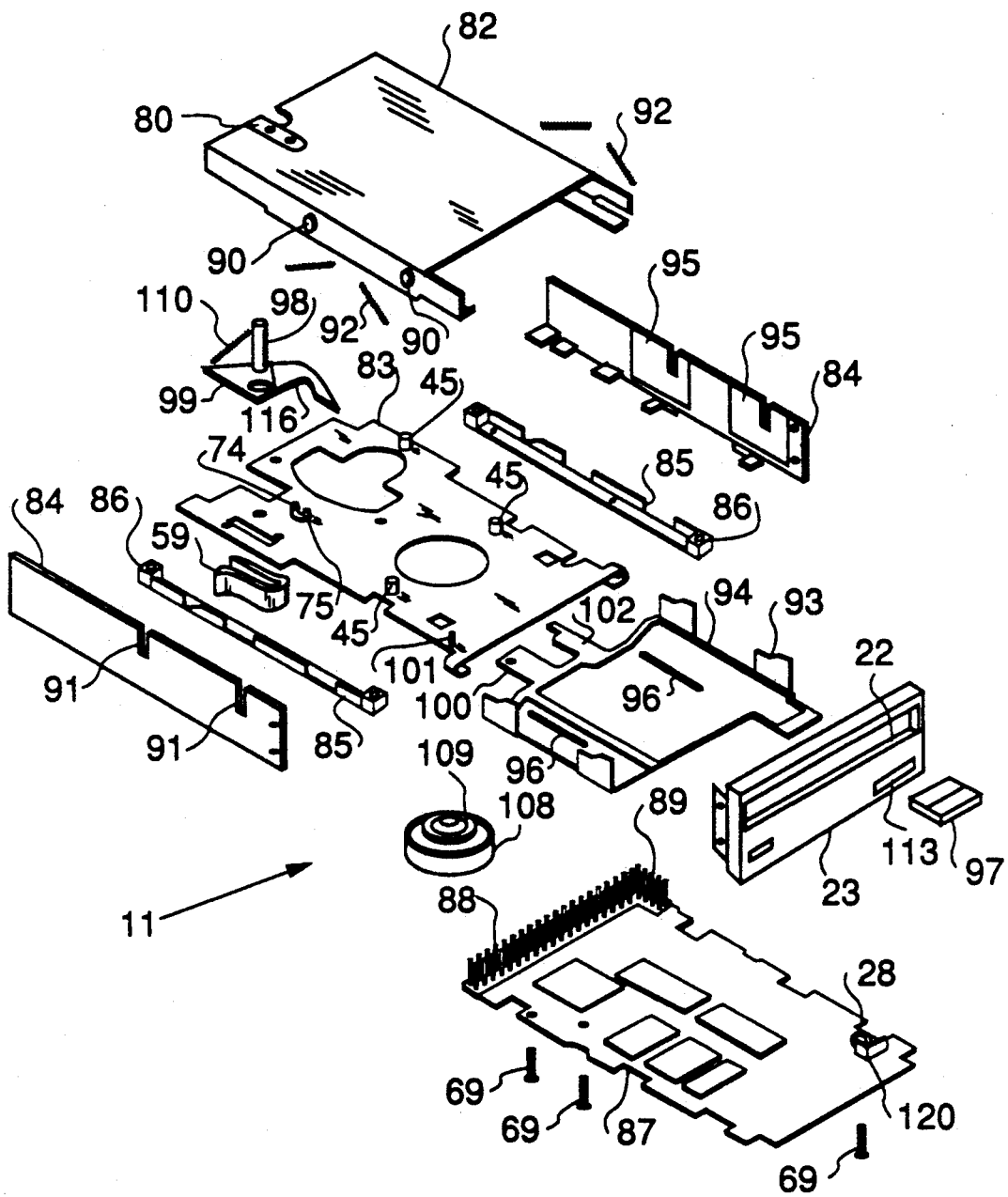

FIG. 10 is an exploded view of the preferred embodiment of the rigid disk drive.

Figure 11:
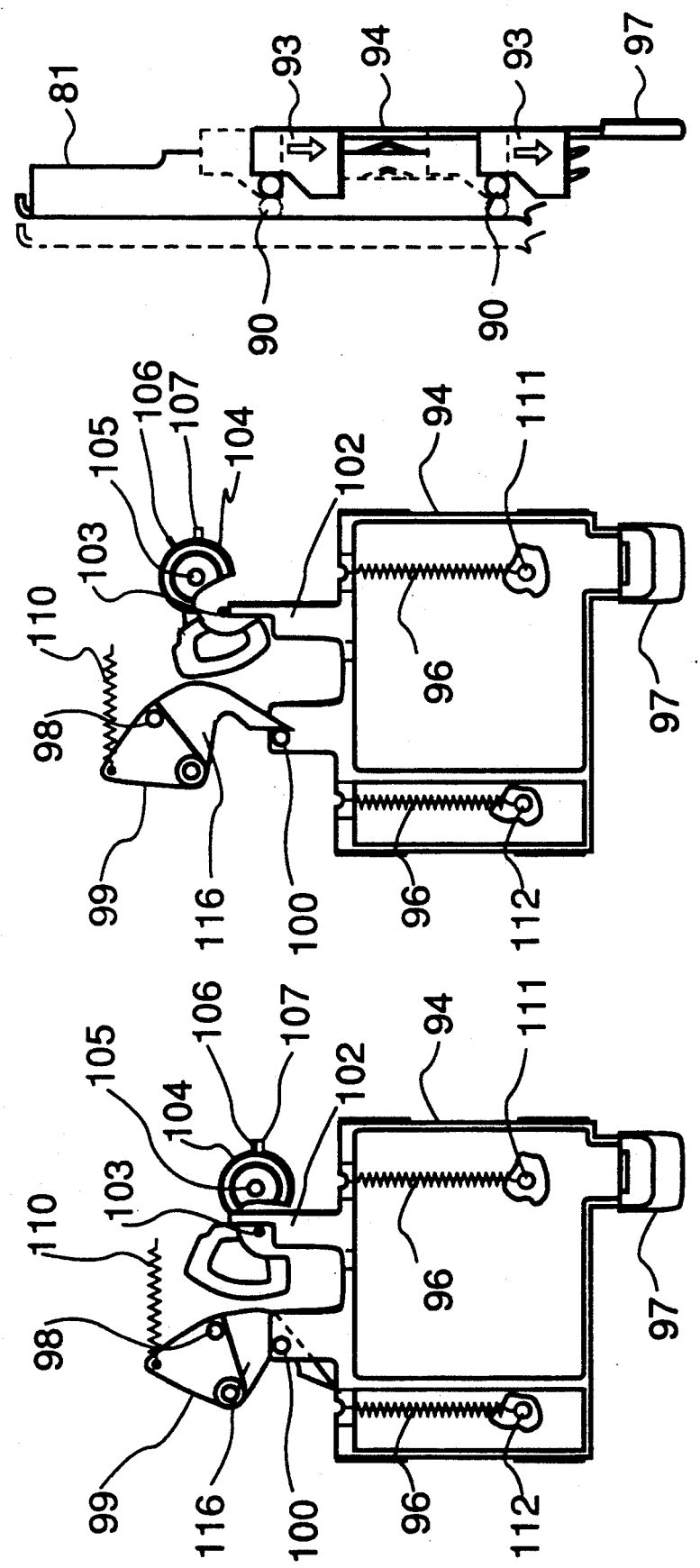

FIG. 11a is a top view of an elevator actuator and voice coil motor shown ready to receive a cartridge into the drive.

FIG. 11b is a view of an elevator actuator and voice coil motor shown with a cartridge positioned in the drive.

FIG. 11c is a side view of the elevator actuator and voice coil motor of FIG. 11b showing both of the positions in FIGS. 11a and 11b.

Figure 12:
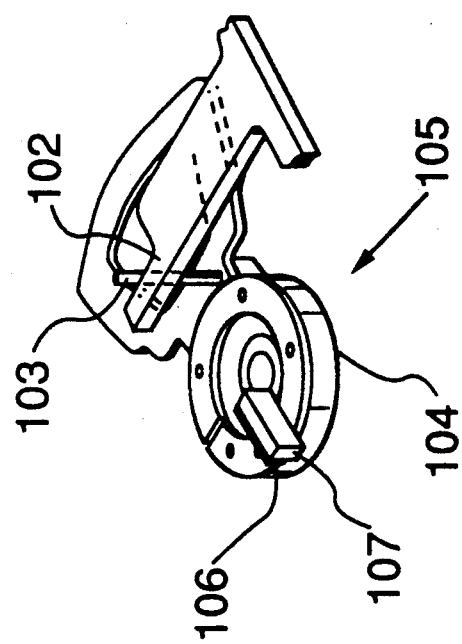

FIG. 12 is a perspective view of the interplay between the voice coil motor hub and the tab.

FIG. 13a a perspective view of an alternative head loading and unloading means, shown in the head unloaded position.

FIG. 13b the perspective view of the alternative embodiment of FIG. 3a in the head loaded position.

Figure 13C:
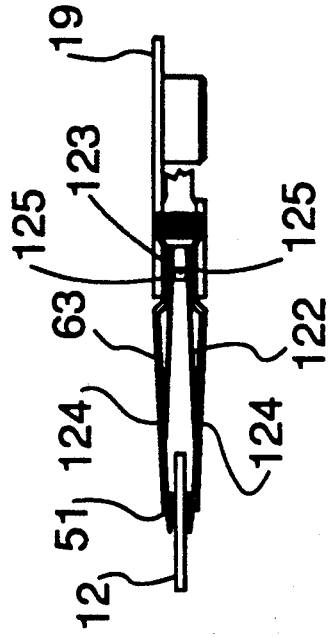

FIG. 13c shows the side view of the alternative embodiment of the head loading and unloading means in the head loaded position.

Figure 13D:
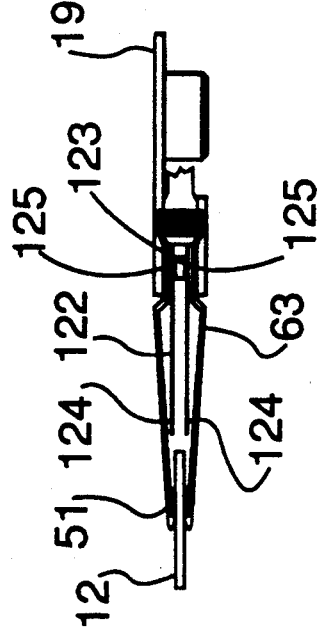

FIG. 13d shows the side view of the alternative embodiment of the head loading and unloading means in the head unloaded position.

DETAILED DESCRIPTION OF THE PREFERRED EMBODIMENT

Figure 1:
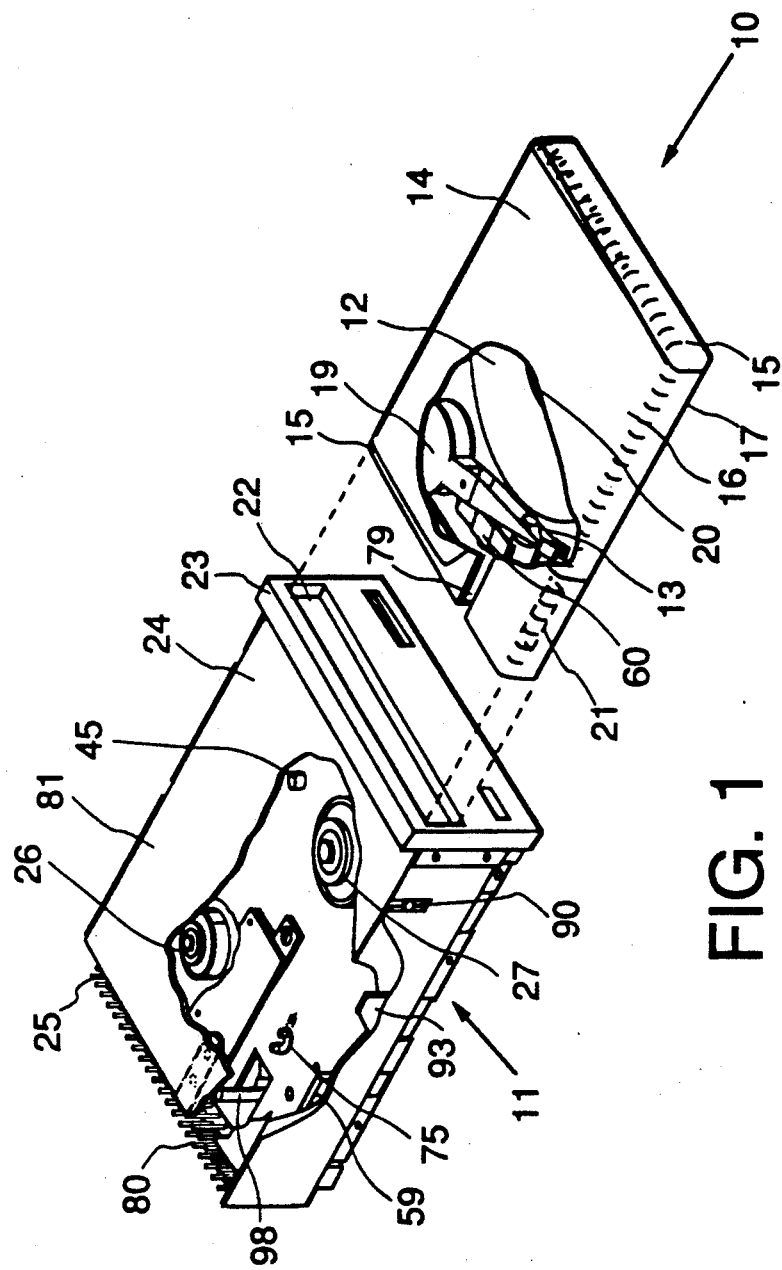
FIG. 1 is a partially broken perspective view of the preferred embodiment of the present invention, including the rigid disk cartridge and rigid disk drive.

As shown in FIG. 1, a preferred embodiment of the present invention comprises a rigid disk cartridge 10 and a removable rigid disk drive 11. Drive 1? is normally inserted into a slot formed in a computer chassis, as is well known in the art, and is operatively connected to the computer by means of an interconnect socket or cable end which mates with the interface connector 25. In operation, the cartridge 10 is inserted into the slotted opening 22 of disk drive 11, and is caused to operatively engage various drive means and electrical interconnects, as will be more fully described below.

Enclosed within the housing of the cartridge 10 is a rigid disk 12, disk reading/writing means 13, a rotary actuator spindle assembly 19, an elastomeric connector 21 and a head loading/unloading ramp mechanism 60. The disk 12 consists of a rigid magnetic substrate and is used for the storage and retrieval of data. The disk reading/writing means 13 is employed to provide access to the data stored on the disk 12, as well as to add to and/or revise existing data. The rotary actuator spindle assembly 19 causes the disk reading/writing means 13 to be in contact with the disk 12, or to be separated from the disk. Electrical connection between the cartridge and the drive is achieved by the elastomeric connector 21. The head loading/unloading ramp mechanism 60 keeps the head and the disk separated, thus protecting them from crashing into each other while the cartridge is outside of the drive. Significant advancement over the prior art is made by the inclusion of the disk 12 and the disk reading/writing mechanism 13 within the same housing. This provides the cartridge 10 with enhanced stability and the ability to be transported and interchanged with other drive units without head misalignment or similar problems.

The cartridge casing 14 is made of thin sheet metal having corners and edges that are encapsulated with plastic 15. In an alternative embodiment, an additional layer of magnetic shielding sheet metal can be added. The use of a metal casing (and, alternatively, an additional layer of magnetic shielding sheet metal) provides significant improvement in radiation shielding, electromagnetic shielding, temperature resistance and shock resistance capabilities over prior art. The plastic edges and corners protect the cartridge from dents when it is dropped onto a hard or rough surface.

The cartridge 10 is hermetically sealed by means of adhesive sealing at the interface between the cover 16 and the base 17, as well as by use of magnetic fluid seals (not shown) at the shafts of both the rotary actuator spindle assembly 19 and disk spindle assembly 20. Because of this sealing, the recording media, i.e. the rigid disk 12 and the reading/writing means 13, are protected from any external environmental contamination.

When cartridge 10 is inserted into the drive 11, it is electrically connected to the drive 11 via engagement between elastomeric connectors 21 and 59 (described below), whereby such connection is achieved by surface contact without the mechanical insertion of pins into receptacles as in the prior art. Thus, no wear is induced. This provides significant improvement over prior art in terms of reduced contact wear from repeated insertion and removal of the cartridge 10.

The cartridge cover 16 has a key slot 79 provided in the top panel on the end which is first inserted into the drive. A guide strip 80 having the same width as the key slot, is disposed on the lower side of the elevator 81 in drive 11 such that, when engaged by the key slot 79, the strip 80 constrains and positions the cartridge 10 within the elevator. It also prevents the cartridge 10 from being inserted upside-down. The entering edge of the cartridge is pushed forward until it contacts post 98.

Behind opening 22 in the drive front bezel 23, a cartridge receiving mechanism 24 is provided to receive and physically move the cartridge into an operational position within the drive. Two rollers 90 residing on each side of the drive housing, interact with split level ramps 93 to guide the elevator between its two resting positions. When a cartridge is received and lowered into position within a drive, the cartridge rests on three datum pads 45 only one of which is shown in this figure. As indicated above, elastomeric connector 21 allows connection of the cartridge 10 to the drive 11 upon insertion of the cartridge into the drive. Driving means 26 are provided to engage and mobilize the reading/writing means 13 when the cartridge 10 is in its operational position, and disk driving assembly 27 are also provided for engaging and actuating the disk 12. A magnet 75 combines with the head loading/unloading ramp mechanism 60 within the cartridge to complete a magnetic circuit and causes the actuator spindle lock mechanism 60 to release the rotary actuator spindle assembly 19. As will be shown in a later figure, switching means 28 are provided to indicate the seating of the cartridge following insertion into the drive, and a separate switching means 120 are provided to determine whether the cartridge is write protected.

Figure 2:
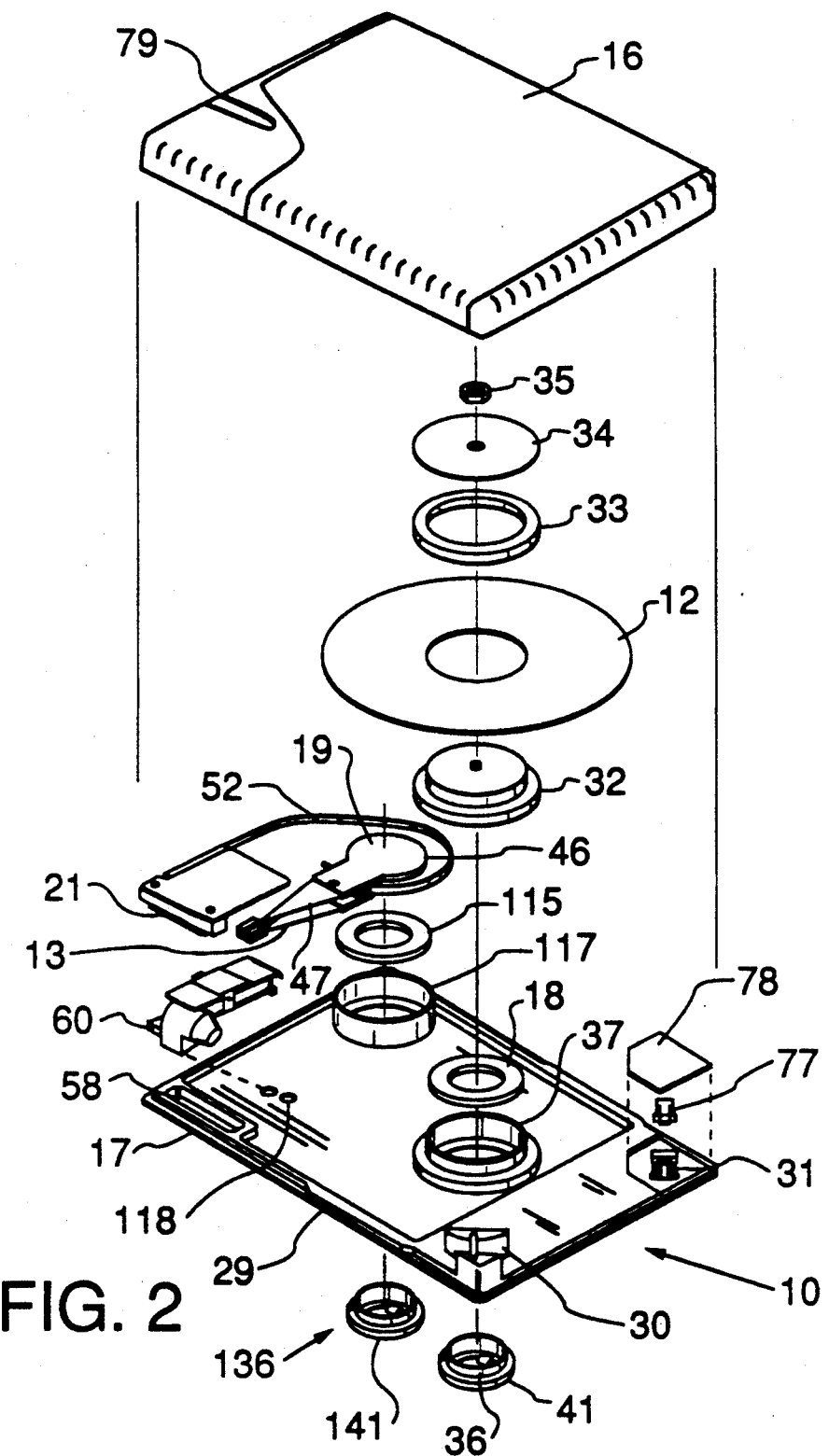
FIG. 2 is an exploded view showing the internal components of the rigid disk cartridge.

Referring to FIG. 2, an exploded view of the preferred embodiment of the rigid disk cartridge 10 is shown. As mentioned above, the body of the cartridge is comprised of a cover 16 and a base 17, both made from thin sheet metal. Additional layer of magnetic shielding sheet metal (not shown) can be added to increase magnetic interference shielding capability in the alternative. A key slot 79, shown in the top cover connects with the guide strip on the drive to constrain lateral movement of the cartridge within the drive. An air filter holder 30 and write protect switch slot 31 are formed from the plastic that encapsulates the ends of the cartridge 10. The position of the write protect switch 77 in the slot provided indicates whether new data is prohibited from being written on the disk. The positioning of the switch 77 is determined by the user and is sensed by a write protector sensor 120 (FIG. 10) installed in the drive. A cover 78 is bonded over the slot to seal the inside of the cartridge from the environment.

Figure 3:
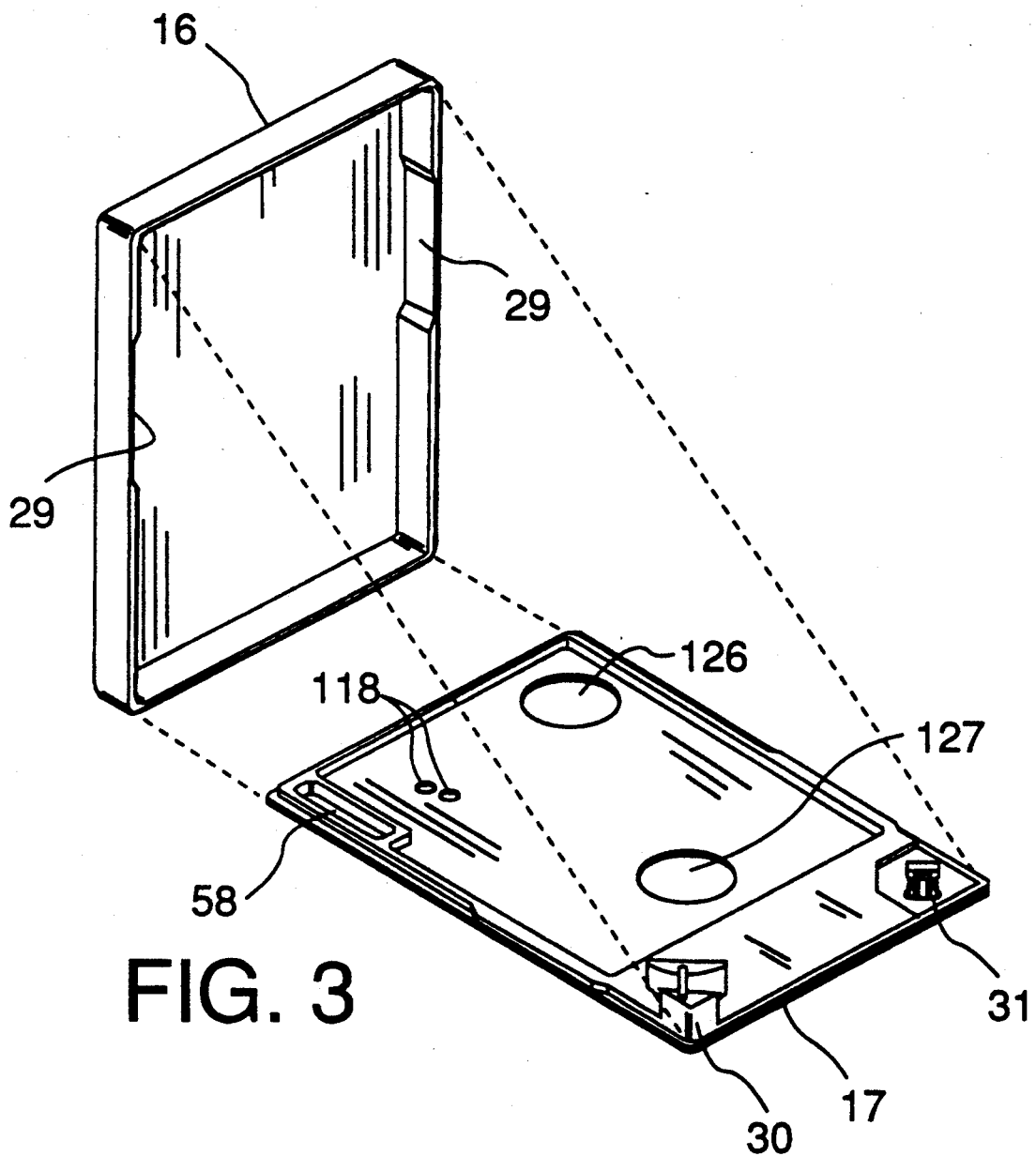
FIG. 3 is a broken apart perspective view of the cartridge housing, showing details of the indentation in the cartridge cover and base.

An important feature of the housing design is the indentation at 29 of a section of the interior side walls, which provides for a minimal thickness of wall material such that minimum cartridge width for a particular sized disk can be achieved. (Details of the indentation and casing design are shown in FIG. 3.)

Further shown in FIG. 2 is an exploded view of the disk spindle assembly 20 (refer to FIG. 1). The disk 12 is secured at the spindle hub 32 by means of a clamping ring 33 or, optionally, a washer. In the case of a clamping ring, the clamping force is applied by the deflection of a clamp spring 34 secured to a threaded projection from the spindle hub 32 by means of a nut 35. The disk spindle assembly 20 is attached to the coupling shaft assembly 36 which in turn is attached to a coupling hub 41, whereby the coupling shaft 36 passes through the magnetic fluid seal 18 located in housing 37 which is bonded to the inside surface of the base 17.

The rotary actuator spindle assembly 19 is a component of the disk drive reading/writing means 13 and includes a hub 46 which carries the head gimbal assembly 47. Similar to the disk spindle assembly 20, the rotary actuator assembly 19 is inserted into, and attached to, a second coupling shaft assembly 136 which extends through a second magnetic fluid seal 115 that is contained within an actuator spindle housing 117. When the cartridge is inserted in the drive II, the coupling hub 141 of the coupling assembly 136 is magnetically attached to a corresponding drive hub of the disk drive unit as will be explained below. A first driving means rotates the disk spindle assembly 20 and a second driving means rotates the actuator spindle assembly 19. Both utilize similar magnetic coupling with the center of rotation defined by the V-groove of the coupling hub 41 and the shaft of the driving means.

The elastomeric connector 21, which is coupled to assembly 19 by a flex cable 52, is extended through a slot 58 in base 17. The integral rotary actuator spindle lock and head load/unload ramp mechanism 60 is bonded to the inside surface of base 17 at a position determined by two alignment pins (not shown) which extend through the holes 118.

FIG. 3 illustrates the inside of covers 16 and 17 of the cartridge housing. The indentations 29 on the interior side edges of the top cover 16 are clearly shown in this figure. The incorporation of the indentations into the cartridge cover enables a minimum cartridge width to be achieved for a particular sized disk. The base 17 contains a slot 58, holes 118, openings 126 and 127, filter holder 30 and write protect switch slot 31.

When a cartridge is disposed in an operational position within a drive, slot 58 will receive the elastomeric connector 21, alignment pins 74 in the base of the drive will protrude through holes 118, and the coupling shaft assemblies 36 and 136 will extend through holes 126 and 127. The air filter holder 30 and write protect switch slot 31, previously discussed, are again shown in this figure.

Figure 4:
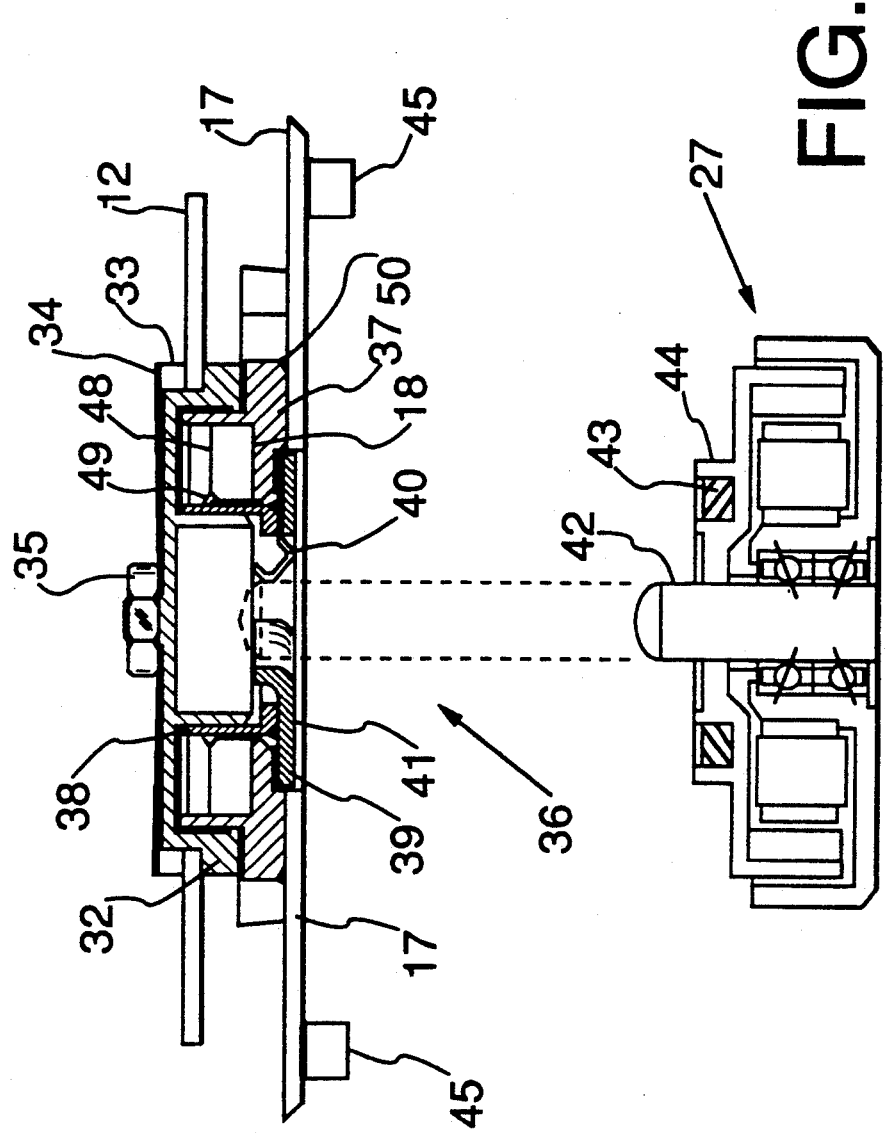
FIG. 4 is a cross-sectional view of the cartridge spindle coupling means and the magnetic clutch hub of the driving means in the disk drive.

FIG. 4 is an axial cross-section taken through the coupling shaft assembly 36 and drive assembly 27. The coupling shaft assembly 36 is disposed within the cartridge 10, and secures the disk 12 at the spindle hub 32 via a clamping ring 33, which is held in place by a clamp spring 34 and a nut 35. The drive assembly 27 is disposed within the disk drive 11. As illustrated in the coupling shaft assembly 36, the collet shaft 38 is bonded to a coupling hub assembly 39 which includes a centering spring 40 and a coupling hub 41. The magnetic fluid seal 18 consists of a ring magnet 48 and associated magnetic fluid 49. The seal 18 is seated in a housing 37 bonded to the inside of the base 17 by means of adhesive 50. Magnetic fluid 49 is applied at the clearance between the fluid seal 18 and the collet shaft 38. The coupling shaft assembly 36 rotates freely about the fluid film 49 supported by the ring magnet 48. This magnetic fluid film 49 seals the inside of the cartridge from its surrounding air while allowing radial and axial movement of the coupling shaft 36 such that the coupling hub 41 can engage with the magnet hub 44, and align with the shaft 42 of the driving means in the drive assembly 27.

As will be further discussed below, a magnet 43 is located in the magnet hub 44 within the disk drive assembly 27. The magnet 43 attracts the coupling hub 41 when a cartridge is inserted into the drive. The cartridge is positioned and supported by datum pads 45 that allow a clearance between the coupling hub 41 and cartridge base 17. The magnet hub 44 and the coupling hub 41 complete the magnetic circuit.

Figure 5:
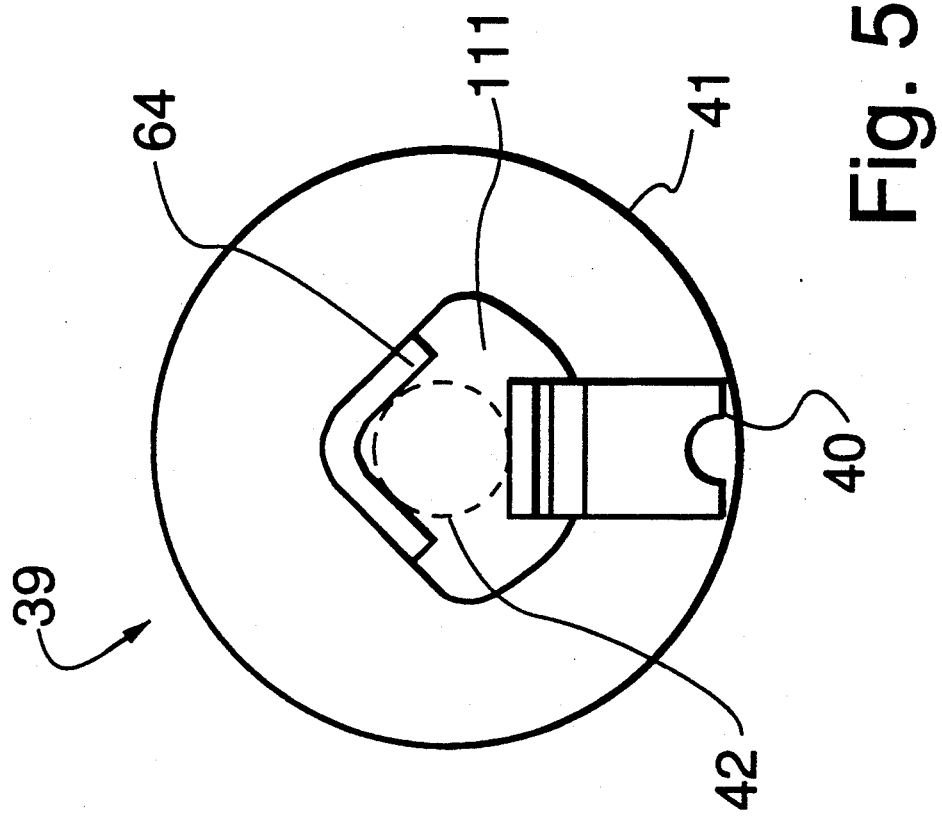
FIG. 5 is a bottom plan view of the cartridge coupling hub assembly of FIG. 4 showing the centering spring urging the shaft of the driving means against the V-groove datum.

FIG. 5 shows a broken top view of the coupling hub assembly 39. The coupling hub 41 has a generally V-shaped hole 111 at its center. As suggested by the dashed line 42, the shaft of driving means 27 protrudes through the hole III in the coupling hub 41 and is positioned by the centering spring 40 to bear against the V-groove 64 formed by the upturned edges of the hub 41, and providing a datum for the rotating axis.

Figure 6:
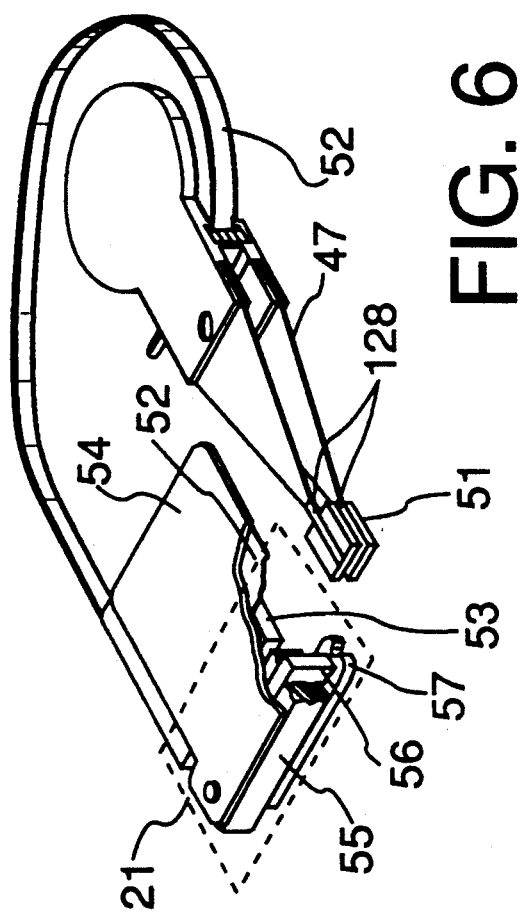
FIG. 6 is a perspective view of the reading means and partially broken elastomeric connector assembly.

Referring to FIG. 6, wire leads 128 from the read-/write heads 51 are connected to a head gimbal assembly 47. The flex and at the other end to a preamplifier 53 carried by the mounting plate 54. An elastomeric connector 21 is also attached to the mounting plate 54. The elastomeric connector 21 consists of an elastomeric connector element 56 installed inside a plastic housing 55. One side of the element is in contact with the flex cable 52 mounted on the mounting plate 54, while the other side of the element is in contact with the connector printed circuit board 57. The printed circuit board 57 includes conductor pads 114 (not shown) which provide electrical connection between the flex cable 52 (via the elastomeric connector 21) and the elastomeric connector 59 in the drive.

Figure 7:
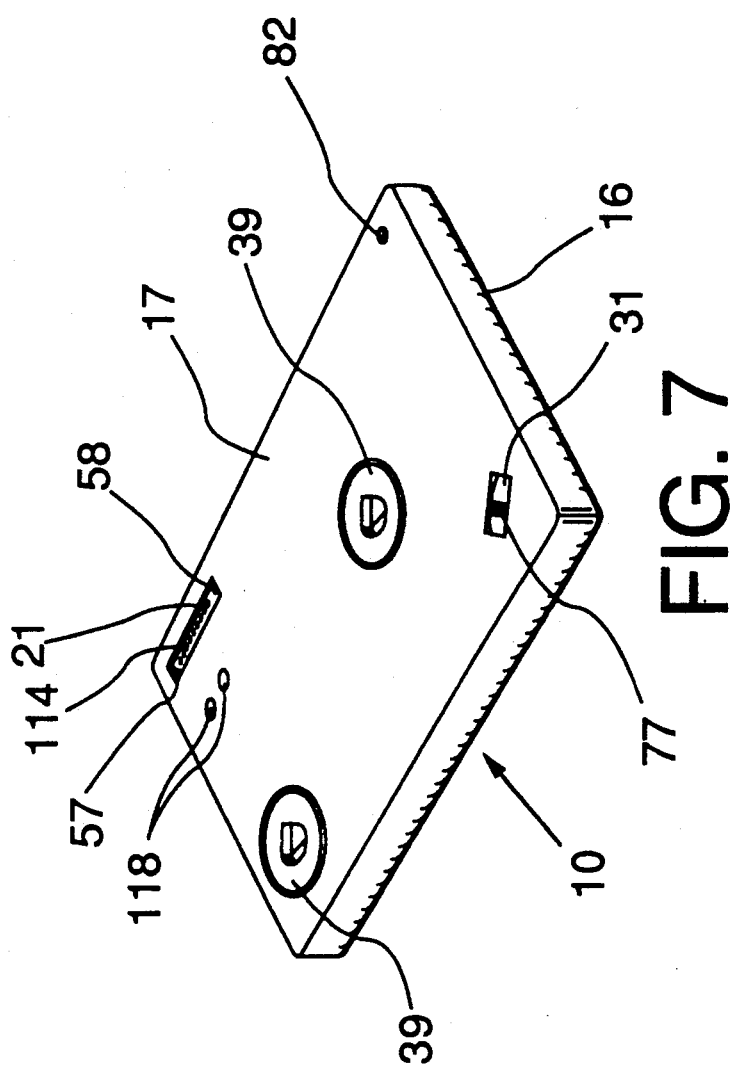
FIG. 7 is a perspective view of the inverted cartridge base.

In FIG. 7, a perspective view of the underside of the cartridge base 17 is shown. When the cartridge 10 is inserted into a drive, a locating in enters hole 82 and locates the cartridge. The locating pin constrains the cartridge against movement in the lengthwise direction. The position of the write protect switch 77, showing through the write protect switch slot 31, determines whether or not new data will be allowed to be written onto the disk. The base of the coupling hub assemblies are shown at 39. The alignment pin holes 118 receive the alignment pins in the disk drive, which position the rotary actuator spindle assembly and the head load/unload ramp.

The printed circuit board 57 of the elastomeric connector 21 is shown through slot 58 in the cartridge base. When the cartridge 10 is inserted in a drive, the conductor pads 114 of the elastomeric connector 21 contact a second elastomeric connector located in the drive, and provide an electrical interface between the recording heads and the drive.

Referring to FIG. 8, the integral rotary actuator spindle lock and head load/unload ramp mechanism assembly 60 is shown. The head load/unload ramp 62 guides the read/write heads 51 of the rotary actuator spindle assembly 19 onto (and off of) the disk 12. As previously mentioned, the mechanism assembly 60 is held in position within the disk drive by two metal pins 61 which are attached to the inside of the cartridge base 17.

The actuator spindle lock 60 consists of a lever 65 loaded by a flat spring 66. The lever 65 is pivots about a pin 69 and is supported by a C-ring 67 attached to the base 119 of the mechanism 60. When the cartridge is outside of the drive, the end 68 of the lever is supported by the base 119 of the mechanism 60 while the opposite end 70 of the lever maintains a distance from the metal pins 61 due to the action of the flat spring 66. Pin 72 is attached to the hub 46 of the rotary actuator spindle assembly 19 in close proximity to the hook 71 disposed at one end 68 of the lever 65. With the lever 65 in the described position, the hook 71 prevents the rotation of the rotary actuator spindle assembly 19 towards the disk 12 by blocking the movement of the pin 72 attached to the hub 46. Due to the position of the mechanism 60, the stop 73 located on its side prevents the rotary actuator from rotating farther away from the disk. The rotary actuator spindle assembly 19 is now constrained to stay in this locked position until the cartridge is inserted and seated in a drive. With the rotary actuator spindle assembly 19 locked, both the heads and the disk are separated and protected from crashing onto each other due to shock, vibration or mishandling while the cartridge is outside of the drive.

When the cartridge is inserted into the drive 11, the bottom of the two metal pins 61 are in line and are in contact with another two pins 74 (FIG. 1) attached to a permanent magnet 75. The magnet 75 in the drive, the pins 74 in contact with pins 61 and the end 70 of the lever complete a closed magnetic circuit. With the end 70 attracted to the pins 61 by magnetic force, the lever rotates about the fulcrum pin 69 so that the other hooked end 68 rotates away from its support on base 119, and its interference with the pin 72 on the rotary actuator spindle hub 46 is removed. With the hooked end 71 of the lever 65 clear of the way of the pin 72 in the rotary actuator spindle assembly 19, the rotary actuator spindle assembly is now unlocked and free to rotate towards the disk.

FIG. 9a is a top view showing the relationship between the mechanism 60, the disk 12 and the rotary actuator spindle assembly 19. As was more clearly illustrated in FIG. 8, the head load/unload ramp 62 is a tapered plastic structure. The distal end is positioned close to, but not engaging, the edge of the disk 12 so that the disk can be installed along the axis of the disk spindle assembly without any interference.

When the read/write heads 51 are being unloaded from the disk 12, the rotary actuator assembly 19 brings the head gimbal assembly 47 towards the ramp 62, as it is rotated away from the disk. Then, the suspension 63 to which the read/write heads 51 are attached engages and is guided by the ramp 62. The tapering geometry of the ramp acting against the spring load of the suspension 63 lifts the heads 51 to complete their unloading away from the disk surfaces. The stop 73 on the mechanism 60 keeps the rotary actuator spindle assembly 19 from moving too far away from the disk 12 when unloading the heads 51.

FIG. 9b illustrates the positioning of the head gimbal assembly 47 when fully loaded onto the disk 12. When the heads are being loaded, the rotary actuator assembly 19 rotates the head gimbal assembly 47 toward the disk 12, and the heads are lowered and positioned onto the disk 12 as the suspension 63 rides down the ramp 62. When the cartridge is removed from a drive, the rotary actuator spindle assembly 19 is locked in an unloaded position by the disposition of the actuator spindle lock mechanism 60, and cannot lower the heads onto the disk. The spindle lock's flat spring 66 forces the hook end 71 of the lever 65 to interfere with the path of travel of the actuator's pin 72, thus prohibiting the rotary actuator spindle assembly 19 from moving toward the disk 12.

Referring now to FIG. 10, an exploded view of the rigid disk drive 11 is shown. The drive base 83 is attached to the side walls 84 by means of welding, adhesive or fasteners. The bottom portion of the side walls 84 is supported by a sheet metal mounting frame 85 with shock mounts 86 to guard against damage from shock or vibration. The assembled drive is installed and attached to the structure frame of a computer via this mounting frame. Base 83 further includes a guide pin 101 which aligns with a hole in the cartridge 10 to guide it to rest atop the three datum pads 45. A magnet 75, having alignment pins 74, causes the actuator spindle lock mechanism 60 in the cartridge 10 to release the rotary actuator spindle assembly 19.

A printed circuit board 87 carrying the drive's electronic components is mounted beneath the base 83 and attached thereto by means of fasteners 69. Switching means 28 indicate when a cartridge is seated in the drive, and includes a write protector sensor 120 for determining the position of the write protect switch. This circuit board provides an interface connector 88 and a power connector 89 at the aft end of the drive, for use in connecting the drive to the host computer. Also provided is an elastomeric connector 59 which is mounted to the base and attached to the printed circuit board 87. The top of this connector is in contact with the elastomeric connector 21 (FIG. 2) when the cartridge is in the drive.

An elevator mechanism 81, which is a sheet metal structure with four pinned rollers 90, two rollers mounted on each of its sides, is captured in and guided by vertical slots 91 in the side walls 84 of the drive. A guide strip 80, on the underside of the elevator 81, constrains and positions the cartridge within the drive. The elevator is pre-loaded by means of extension springs 92, causing the rollers 90 to rest atop the ramps 93 which are a part of an elevator actuator 94. The elevator actuator 94 is loaded via extension springs 96. The pin 100 latches onto the hook 116 of the elevator latch 99, and maintains the elevator in an up position. Tab 102 prevents the voice coil motor 105 from rotating.

When the rollers 90 are resting on the top of the ramps 93 of the elevator actuator, the elevator 81 is situated so that its front is aligned with the opening 22 on the drive front bezel panel 23 (attached to the front edges of side walls 84) and is ready to receive a cartridge 10. Two recesses 95 are provided on the interior of each side wall 84 for receiving the ramps 93. This helps to minimize the width of the drive. The use of sheet metal and indentation arrangement in the cartridge, together with the recess in the side wall, give maximum space efficiency. This allows the removable drive to have substantially the same footprint in width as a fixed rigid disk drive for a particular disk size in spite of the fact that additional components, such as the cartridge receiving mechanisms, are provided This removable disk drive can therefore fit the slot in a computer casing which is designated for a fixed disk drive of the same disk size.

The post 98 that is attached to the elevator latch 99 acts as a stop for a cartridge that had been inserted into the disk drive. The cartridge is ejected via the spring action of the spring 110 attached to post 98. The front end of the elevator actuator 94 includes and eject button 97 which protrudes through a slot 113 on the front bezel 23. The DC motor 108, which houses the voice coil motor 105, is shown with its magnetic clutches 109 exposed.

FIG. 11a illustrates the position of actuator 94 when the elevator is in its top position, ready to receive a cartridge. The elevator actuator 94 is a frame structure loaded by two extension springs 96 which are attached to the base frame 83 at points 111 and 112. The frame structure allows minimum utilization of space. Much of the center portion of the elevator actuator frame is hollowed out to provide clearance for the electronic components on the printed circuit board 87 which is mounted directly below. When the elevator is in a cartridge receiving position, the tab 102 blocks pin 103 attached to the hub 104 of the voice coil motor 105. This prevents the voice coil motor 105 from rotating beyond the position of the tab until the elevator is lowered. Another tab 106 is attached to the voice coil motor hub 104. This tab is attracted to and bears against a magnet 107 mounted on the base. This defines the voice coil motor parking position. When the cartridge is outside of the drive, the voice coil motor is locked as it is constrained in both directions. Similarly, hook 116 on the elevator latch 99 latches onto pin 100 to maintain the elevator in an up position, until a cartridge is inserted into the drive.

In FIG. 11b illustrates the position of the elevator actuator 94, voice coil motor 105 and elevator latch 99, when a cartridge is within the drive. Note that the tab 102 at the rear of the elevator actuator 94 is now clear of the pin 103 mounted beneath the voice coil motor hub 104. The voice coil motor 105 is thus unlocked and free to rotate in the direction of the tab, once the voice coil motor 105 is energized. Additionally, the hook 116 no longer constrains pin 100.

FIG. 11c is a side view of the elevator 81 shown in FIGS. 11a and 11b. The solid lines show the positioning of the elevator 81 when a cartridge is within the drive. When removal of the cartridge is desired, an operator pushes the eject button 97 which moves the elevator actuator 94 forward. This movement forces the rollers 90 up the split-level ramps 93. The dashed lines represent the positioning of the elevator 81 after the cartridge has been rejected from the drive, and while waiting for another cartridge to be inserted into the drive.

FIG. 12 illustrates a voice coil motor 105 in a locked position. Tab 106, attached to the voice coil hub 104, is attracted to and bears against magnet 107 which is mounted on the base. Pin 103, also attached to the voice coil hub 104. is blocked by tab 102 and thus prevents the motor from rotating until the a cartridge is inserted into the drive and the elevator is lowered into an operative position.

The operation of the system begins with the insertion of a cartridge 10 into a disk drive 11. When the cartridge 10 is inserted into the elevator 81, an elongated guide strip 80 at the top, inside of the elevator 81, fits into the key slot 79 on the cover 16 of the cartridge 10. It guides and constrains the lateral movement of the cartridge 10.

When the cartridge 10 is lowered onto the drive base 83 by the elevator 81, under the action of the extension springs 92, a guide pin 101 attached to the drive base 83 aligns with the slotted hole 82 at the cartridge base 17 to guide it down until the cartridge base 17 rests on top of the three datum pads 45 mounted on the base 83.

When the cartridge 10 is loaded and lowered by the elevator 81, a mechanical switch 28 detects that the cartridge is in a down position. The coupling hub 41 of the disk spindle 20 and the coupling hub 41 of the rotary actuator spindle 19, both components of the cartridge 16, engage with the drive 27 (D.C. motor 108) and the drive unit 26 (voice coil motor 105) respectively, by means of magnetic clutches 109. The switch 28 turns on the D.C. motor 108 and energizes the voice coil motor 105. The voice coil motor 105 is unlocked due to the retraction of the elevator actuator 94. The rotary actuator spindle 19 in the cartridge is unlocked due to the rotation of the lever 65 activated by a magnet 75 in the drive and which is situated underneath the pins 61 located on the base 17 of the cartridge 10. The D.C. motor drives the rigid disk 12, and the voice coil motor 105 drives the actuator assembly 19 according to the commands received form the computer via the interface connector.

A write protect sensor 120 mounted on the PC board 87 is located beneath the position of the write protect switch 31 on the base 17 of the cartridge 10 when the cartridge is loaded in the drive. This sensor detects the position of the write protect switch 31 to determine whether or not data can be written onto the disk 12.

When the eject button 97 is pushed, the elevator actuator 94 is pushed forward into the drive and forces the rollers 90 on the elevator 81 to ride up the ramps 93 on both sides of the actuator. At the same time, this forward motion of the actuator 94 causes the pin 100 to latch onto the hook 116 of the elevator latch 99. This engagement keeps the elevator 81 in an up position, aligning the front of the elevator with the opening 22 on the front bezel 23. Additionally, as the elevator latch 99 rotates, its post 98 ejects the cartridge 10 from the drive under the action of the spring 110. Additionally, the inward motion of the elevator actuator causes tab 102 to push against the pin 103 on the voice coil motor 105. This rotates the voice coil motor towards its parking position a the tab 106 becomes attached to the magnet 107 by magnetic attraction. Moreover, as the actuator raises the elevator 8, the cartridge 10 is lifted up and separated from the elastomeric connector 59, the magnetic clutches 109, the guide pin 101, the datum pads 45, and rotary actuator spindle lock activation magnet 75.

As can be seen from the figures and accompanying detailed description, the disk 12 and disk reading/writing means 13 are innovatively mounted within the same removable cartridge 10. This substantially eliminates head and disk misalignment problems inherent in prior art devices, thus greatly enhancing system interchangeability. Additionally, because the cartridge 10 is a sealed, self-contained unit, there is no exposure to the environment and little chance of disk contamination, a hazard which plagues most functionally similar prior art devices. Furthermore, a significant break-through has been achieved in reducing the size of the cartridge and associated disk drive for a particular disk size so that its ability to be transported and stored is greatly enhanced. The use of thin sheet metal, instead of plastic alone as in the prior art, in the making of the cartridge improves the ruggedness, radiation shielding, electromagnetic interference shielding and handling capability of the cartridge. Hence, this system is ideal for implementation in desktop, laptop, notebook computers, as well as an endless number of unnamed applications which require enhanced space efficiency, ruggedness, portability, and data security FIG. 13a illustrates an alternative device for the loading and unloading of the head gimbal assembly 47. A lifter 122 is situated between the suspensions 63. A semispherical dimple 124 at the tip of the lifter 122 faces the suspension 63 and another dimple 125 faces the tapered ramp 123. The lifter 122 is attached to the rotary actuator assembly 19 by means of a pin 129. When the read/write heads 51 are in the unloaded position, the lifter 122 is deflected as the dimple 125 rides on the broader end of the taper ramp 123. The dimple 124 is in contact with the axis of the suspension 63, separating the read/write heads 51 and without inducing torsional deflection on the suspensions 63.

FIG. 13b illustrates the unloaded position of the gimbal assembly 47. As the head gimbal assembly is rotated towards the disk 12, the dimple 125 on the lifter 122 slides down the ramp 123. The dimple 124 at the end of the lifter 122 separates from the suspension 63 and the read/write heads 51 are thus lowered onto the disk 12.

FIG. 13c shows the side view of the lifter 122 when the read/write heads 51 are in the unloaded position where the dimple 125 is not in contact with the suspension 63 and the dimple 124 is off the ramp 123.

FIG. 13d shows the side view of the lifter 122 when the read/write heads 51 are in the loaded position where the dimple 124 rides on the ramp 123 and the dimple 125 is in contact with the suspension, lifting up the read/write heads 51.

Although the present invention has been described above in terms of a magnetic storage embodiment, it will be appreciated that similar mechanisms could be used to implement an optical or other type of disk storage embodiment. Moreover, it is anticipated that cartridges and drives can be modified to incorporate multiple disks as well as the illustrated single disk. It is therefore intended that the appended claims be interpreted as covering all alterations and modifications which fall within the true spirit and scope of the invention.

As used in the following claims:

"Disk means" shall mean any type of disk media upon which machine-readable data may be stored and shall include optical as well as magnetic storage media;

"Read/write means" shall mean any type of data-reading, data-writing, or data-reading-and-writing heads or transducers.

What I claim is:

1. A miniature removable rigid disk drive and cartridge system comprising:
   disk drive means including
      circuit board means having associated system operation and control electronic components mounted thereon and interconnected by circuit traces thereof;
      cartridge receiving, positioning and ejecting means;
      disk rotating means including a first rotatable magnetic coupling element for driving a cartridge-carried data storage disk means;
      disk-read/write actuator means including a second rotatable magnetic coupling element for actuating a cartridge-carried read/write assembly;
      first connector means carried by said circuit board means for communicatively engaging and coupling information to and from a disk cartridge; and
      interface means for interconnecting said electronic components to an external computing means; and
   cartridge means for insertion into said cartridge-receiving positioning and ejecting means and including
      disk means for containing stored information;
      disk carriage means including a first rotatable hub magnetically engageable with aid first coupling element for drivably coupling said disk carriage means to said disk rotating means;
      read/write means including a second rotatable hub magnetically engageable with said second coupling element for drivably coupling said read/write means to said actuator means; and
      second connector means for engaging said first connector means and coupling information to and from said read/write means.

2. A miniature removable rigid disk drive and cartridge system as recited in claim 1, wherein said cartridge receiving, positioning and ejecting means includes an elevator assembly for receiving said cartridge at one position and for transporting said cartridge to a second position wherein said first and second connector means are communicatively connected together, said first coupling element is spaced a predetermined coupling distance from said first hub allowing said disk rotating means to drive said disk means, and said second coupling element is spaced a predetermined coupling distance from said second hub allowing said actuator means to actuate said read/write head means.

3. A miniature removable rigid disk drive and cartridge system as recited in claim 1 wherein said read/write means includes a plurality of read/write heads for transferring information to/from said disk means.

4. A miniature removable rigid disk drive and cartridge system as recited in claim 1 wherein said cartridge means includes a housing having disk-receiving pockets formed in the interior side walls thereof for receiving the outer extremities of said disk means such that the width of said cartridge means is only slightly greater than the diameter of said disk means.

5. A miniature removable rigid disk drive and cartridge system as recited in claim 1 wherein said first and second hubs are surrounded by magnetic seals for preventing contamination of the interior of said cartridge means.

6. A miniature removable rigid disk drive and cartridge system as recited in claim 1 wherein said first connector means is an elastomeric connector having a first plurality of contacts for resiliently engaging a second plurality of contacts.

7. A miniature removable rigid disk drive and cartridge system as recited in claim 6 wherein said second connector means is an elastomeric connector having a second plurality of contacts for resiliently engaging said first plurality of contacts.

8. A miniature removable rigid disk drive and cartridge system as recited in claim 1 wherein said read/write means includes at least one read/write head for transferring information to/from said disk means.

* * * * *